United States Patent [19]
Hunt

[11] Patent Number: 5,598,921
[45] Date of Patent: Feb. 4, 1997

[54] COMPUTER WORKPLACE ORGANIZER

[75] Inventor: Thomas A. Hunt, Encinitas, Calif.

[73] Assignee: Spectrum Concepts, Encinitas, Calif.

[21] Appl. No.: 540,641

[22] Filed: Oct. 11, 1995

[51] Int. Cl.$^6$ ................................................ B43M 17/00
[52] U.S. Cl. ........................ 206/214; 206/576; 206/371
[58] Field of Search .................................. 206/214, 576, 206/224, 371; 211/11, 126, 133

[56] References Cited

U.S. PATENT DOCUMENTS

| | | | |
|---|---|---|---|
| 2,720,189 | 10/1955 | Newman | 206/214 X |
| 4,176,743 | 12/1979 | Fitzpatrick | 206/214 |
| 5,119,932 | 6/1992 | Semanoff | 206/214 |
| 5,134,918 | 8/1992 | Chang | 206/214 X |

*Primary Examiner*—Jacob K. Ackun
*Attorney, Agent, or Firm*—Bernard L. Kleinke; Peter P. Scott

[57] ABSTRACT

A one-piece molded plastic computer workplace organizer can be screwed to a baseplane such as a pull-out keyboard shelf of a computer desk. A mouse pad is located to the front of the organizer unit which provides a passageway for retaining the mouse cord in place so as to overcome the common problem of the mouse unit working its way to the rear and falling off the shelf edge, especially when the shelf is being pulled out. Storage for several 3½" diskettes is provided with asymmetrical bistable support positioning: a nearly upright rearwardly-inclined working position and a low profile forwardly-inclined storage position. With the organizer mounted on the pull-out keyboard shelf, upright diskettes will be automatically flipped forward to the low profile position by the shelf edge for storage under the desk counter top when the shelf is pushed back into the storage position. The organizer also provides a tray for pens and pencils, a holder for page-by-page dispensing of an adhesive note pad, a compartment for small items such as paper clips, and a support channel along the rear for business cards or the like.

9 Claims, 2 Drawing Sheets

COMPUTER WORKPLACE ORGANIZER

FIELD OF THE INVENTION

The present invention relates to the field of computer accessories, and more particularly it relates to a computer workplace organizer for use in conjunction with a keyboard and mouse unit located on a sliding keyboard shelf.

BACKGROUND OF THE INVENTION

The operation of a desk top computer gives rise to a number of requirements that have not been adequately satisfied.

Computer workplace desks are commonly provided with a sliding keyboard shelf disposed a few inches beneath the main desktop and mounted on slides so that it can be pulled forward to a working position and pushed back under the main desktop for storage. Such an arrangement is generally quite satisfactory with regard to the keyboard itself. However in a typical setup which includes a mouse unit resting on the shelf with its attachment cord directed to the rear, frequently a hanging loop portion of the mouse's cord tends to pull the mouse toward the rear until it falls over the rear shelf edge, particularly when the shelf gets pulled forward to its working position; thus the mouse becomes temporarily "lost" and is often difficult to retrieve.

Furthermore, there are a number of needs that often remain unfulfilled at computer workplaces; e.g. retention and page dispensing of adhesive note pads, supported retention of a few 3½" floppy diskettes, and storage of small items such as paper clips.

DISCUSSION OF RELATED KNOWN ART

Desktop organizers for pens, pencils, pads and the like have been known: examples are found in U.S. Pat. Nos. 4,919,276 to Kim & Kim, 4,176,743 to Fitzpatrick and 4,475,022 to Polhemus et al.

U.S. Pat. No. 5,215,198 to Sutton discloses a "flip-through" type disk holder that provides bistable support such that there are two symmetrical support positions of equal disk height.

Desktop organizers for use in connection with computers are exemplified in the following patents:

U.S. Pat. No. 5,265,735 to Hassel et al discloses a modular desktop organizer for mounting to the top rear surface of a computer keyboard.

U.S. Pat. No. 5,405,168 to Holt discloses a combination mouse pad and note pad.

U.S. Pat. No. 5,413,294 to Greenquist discloses a mouse pad bridging platform that mounts onto the right hand end of a computer keyboard.

The above examples or other known art fail to address the primary problem addressed by the present invention, i.e. potential mouse escape as described above; also they fail to provide the total combination of organizer features provided by the present invention.

OBJECTS OF THE INVENTION

It is a primary object of the present invention to provide an organizer accessory for a desktop computer workplace where a mouse unit is deployed on a sliding keyboard shelf of a computer desk, including as a key organizer feature of the invention, cord constraint means acting in a manner to prevent the mouse unit from shifting to the rear and falling off the rear edge of the shelf.

It is a further object to provide in the organizer accessory a combination of organizing features including storage/dispensing for a small adhesive note pad, storage/support for a quantity of 3 ½" diskettes, and storage compartments for pens, pencils, business cords, paper clips and the like.

It is a further object to provide multiple bistable support cells for 3½" disks such that one of the two asymmetric supported positions is of low profile, so that with the organizer fastened to a sliding shelf defining a storage space under a counter top of a desk, the edge of the desk counter top will cause the disks to automatically flip from an upright working position to the low profile storage position when the shelf is pushed in to the storage location.

SUMMARY OF THE INVENTION

The above mentioned objects have been accomplished by the present invention of a one-piece molded plastic organizer unit including recessed screw holes for fastening to a baseplane, typically a sliding shelf located beneath the counter top of a computer desk. The main body is raised from the baseplane by end support members, e.g. short legs, at each end, forming with the baseplane a passageway just high enough to allow the mouse cable to pass through, remaining constrained between the end support members. The passageway is made too low for the mouse unit to enter, thus if the mouse unit starts to move toward the rear, e.g. as urged by its cord, it will become blocked against the organizer unit, and thus prevented from escaping over the rear edge of the shelf.

A complementary mouse pad may be located on the shelf to the front of the organizer.

Support for several (e.g. five) 3½" diskettes is provided with bistable supported positions: a nearly upright working position with a slight rearward inclination and a low profile forwardly inclined position. With the organizer mounted on a desk's pullout keyboard shelf, diskettes can stand in the working position when the shelf is out it its working position; then when the shelf is pushed back into the storage location, the diskettes will automatically be flipped forward to the inclined position by the desktop edge for storage under the desk. The organizer also provides a tray for pens and pencils, a compartment for small items such as paper clips, and an upwardly-facing rear slot for business cards and the like.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
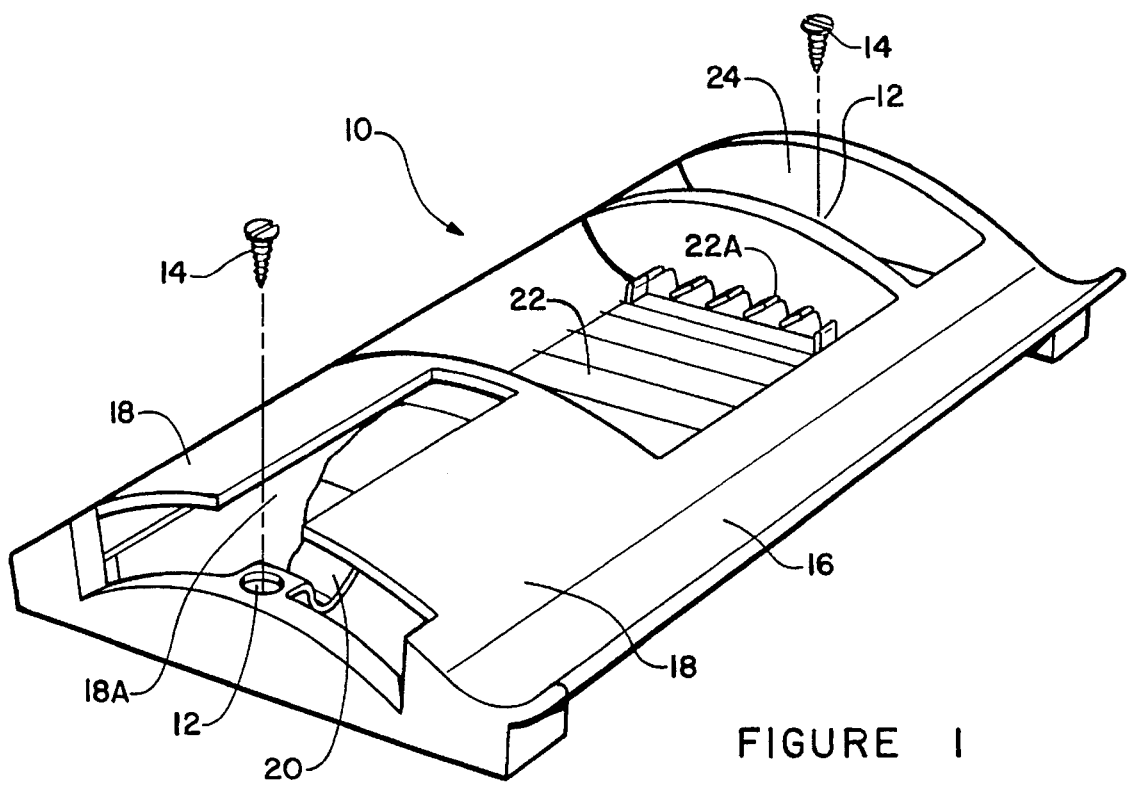
FIG. 1 is a perspective view of an organizer of the present invention showing mounting screw locations.

FIG. 1 is depicts the organizer 10 of the present invention in a perspective view. A pair of recessed mounting screw openings 12 are provided for mounting screws 14 as shown, by which the organizer 10 can be fastened to a baseplane which is typically a pullout keyboard shelf of a desk. Organizer 10 is molded in one piece from plastic to form a front trough 16 for pens and pencils, an end-loaded note pad holder at the left hand end having a central slot 18A dividing the arched surface 18 and a spring lever 20 formed integrally from the molded plastic for maintaining upward pressure under the note pad, a diskette support rack 22 with a row of vanes 22A at each side for supporting 3½" diskettes, and a compartment 24 at the right hand end for small items such as paper clips or thumb tacks with arched walls to match arched surface 18.

Figure 2:
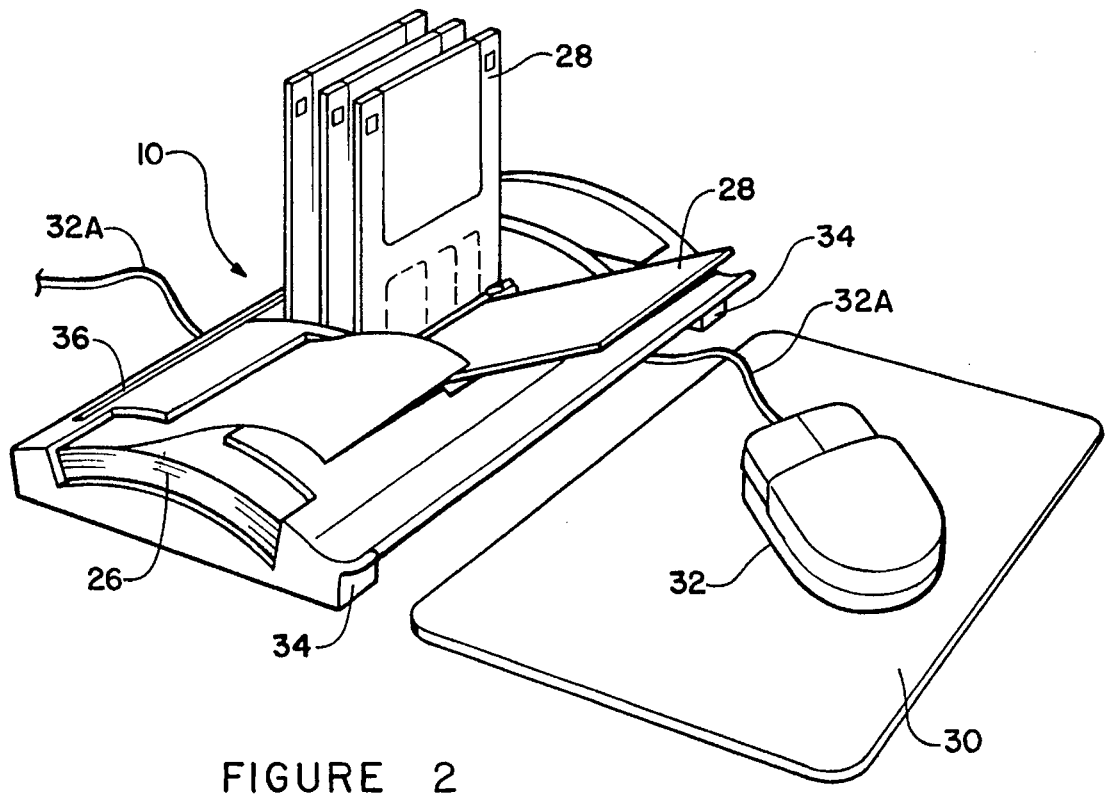
FIG. 2 is a perspective view of the organizer of FIG. 1 as utilized in service with a stored note pad and diskettes in place, along with the mouse pad and an associated mouse unit, showing the mouse cord in place, running beneath the organizer.

FIG. 2 is a perspective view of the organizer 10 of FIG. 1 as utilized in service with a stored note pad 26 and diskettes 28 in place, along with a mouse pad 30 on which is shown the associated mouse unit 32 with its attached cord 32A in place, running through a passageway formed by the main body of organizer being raised about ½" from the support plane by feet 34 formed at each end, thus allowing the mouse cord 32A to pass under freely while being retained generally in place between feet 34. This arrangement serves to prevent escape of the mouse unit 32 to the rear, since it will become blocked by contact with organizer 10.

Three diskettes 28 are shown supported in an almost vertical upright working position while one diskette 28 is shown supported in the other bistable position: a low-profile forwardly-inclined storage position.

An upwardly-open support channel 36, for holding business cards and the like, is seen at the rear; this extends full width of organizer 10.

Pad 26 may be of the well known "Post-It" brand, e.g. 3M R330, in a fan-folded form, such that one page at a time can be dispensed conveniently through slot 18 as shown.

Figure 3A:
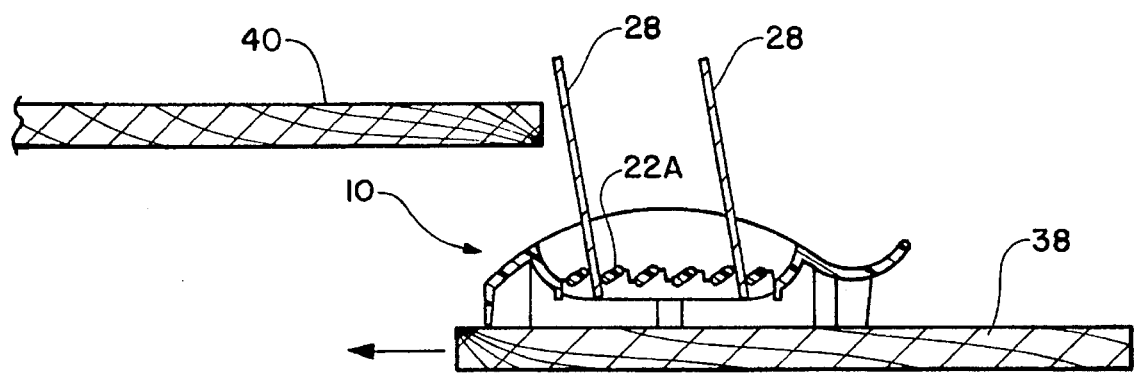
FIG. 3A is a cross-sectional view of the organizer of FIG. 2 showing diskettes supported in the upright working location.

FIG. 3A is a cross-sectional view of the organizer 10 of FIG. 2, mounted on a slide-out shelf 38, showing diskettes 28 supported by vanes 22A in the upright working location, when the shelf 38 is in the working position as shown, substantially forward of the desk counter top 40.

Typically at the end of a work session, the sliding shelf 38 along with organizer 10 is pushed to the rear into a storage region as indicated by the lower arrow; during this transition, the counter top 40, contacting the rearmost diskette 28, will act to flip the diskettes 28 forwardly, as indicated by the upper arrow, to their low-profile storage location.

Figure 3B:
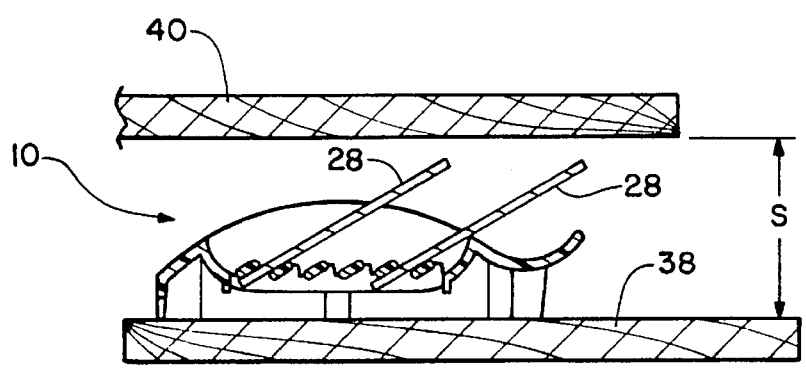
FIG. 3B is a cross-sectional view of the organizer of FIG. 2 showing the diskettes in forward inclined storage location.

FIG. 3B depicts the subject matter of FIG. 3A with shelf 38 and organizer 10 having been pushed to the rear into the storage region: in moving rearwardly from the location shown in FIG. 3A, the diskettes 28 are seen having been flipped forwardly by counter top 40 to the low-profile storage position as shown, such that they fit under the counter top 40 as shown. The typical storage space height S is 2¾".

For the next work session, when the shelf 38 is pulled out to the working position as in FIG. 1, the diskettes 28 are easily flipped up and back by a finger, returning to the upward working position shown.

Alternatively, the organizer 10 can be located on a fixed flat surface such as the upper surface of counter top 40, and may be optionally be fastened or place or simply left resting in place with the possible assistance of adhesive or anti-skid pads on the bottom of feet 34.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An organizer for a computer workplace, comprising:

a main body, molded as an integral unit from plastic, constructed and arranged to provide a pen and pencil trough, a note pad holder, a diskette rack, a utility compartment for small items, and an upwardly-facing channel formed along a rear region of the main body for supporting business cards and the like;

a pair of support means, formed in said main body at opposite ends thereof and extending downwardly therefrom, constructed and arranged to support said main body at opposite ends thereof so as to hold a major portion of said main body raised above the baseplane sufficiently to provide a front-to-rear passageway, whereby an attachment cord of a mouse unit utilized in conjunction with said mouse pad is provided passage and retained between said pair of support means; and attachment means for attaching said main body, at each opposite end thereof, to a flat horizontal baseplane;

the diskette rack of said main body being constructed and arranged to provide bistable support to a plurality of 3½ inch computer diskettes such that a nearly upright supported position is provided for a working mode and an inclined supported position is provided for a lower profile storage mode for fitting into a storage region of predetermined height less than three inches.

2. A computer workplace organizer, for use in co-operation with a mouse unit disposed on a horizontal baseplane and having an associated attached cord, comprising:

a main body portion of said organizer constructed and arranged to define a generally horizontal bottom surface, a pair of end support portions, formed integrally with said main body portion at opposite ends thereof, extending downwardly therefrom, receiving support from the baseplane and defining a passageway between said main body portion and the baseplane, the passageway being made to have a predetermined height so as to provide free passage of the cable through the passageway while blocking the mouse unit from entering the passageway;

whereby said organizer is enabled to contain the mouse cable within the passageway in a manner to retain the mouse unit within a region generally forward of the organizer and to thus prevent rearward escape and misplacement of the house unit;

wherein said main body portion is constructed and arranged to further provide in combination a pen and pencil trough, a note pad holder, a diskette rack and a utility compartment for small items;

wherein the diskette rack is constructed and arranged to provide bistable support to a plurality of computer diskettes such that a nearly upright supported position is provided as a working mode and an inclined supported position is provided as a storage mode defining a lower profile that fits into a storage region of predetermined height;

the organizer being associated with a desk having a counter top and a pull-out sliding shelf disposed at a level beneath that of the counter top, wherein:

the storage region is located beneath the counter top extending downwardly to the level of the sliding shelf;

said baseplane comprises the sliding shelf;

said end support portions are fastened to the sliding shelf; and said organizer is constructed and arranged to enable a forward edge of the counter top to flip supported diskettes from the upright working position to the inclined storage position automatically whenever the sliding shelf is moved from an outward working location to an inward storage location.

3. The organizer as defined in claim 2 wherein said main body portion is formed and arranged to provide along a rear region thereof an upwardly-facing channel for supporting business cards and the like.

4. The organizer as defined in claim 3, further comprising a mouse pad disposed on said baseplane, forward of said body.

5. The organizer as defined in claim 3 wherein said main body portion and said end support portions are molded in one integral piece from plastic.

6. The organizer as defined in claim 2 wherein the predetermined height is less than three inches.

7. The organizer as defined in claim 2 further comprising spring means for supporting a note pad in a substantially horizontal position in the note pad holder, constructed and arranged to urge the note pad upwardly against an overhead constraint.

8. The organizer as defined in claim 7 wherein said spring means comprises a cantilever spring integrally molded from plastic as part of said main body.

9. The organizer as defined in claim 7 wherein the note pad holder is constructed and arranged to provide an open-ended aperture in the overhead constraint in a region thereof immediately above said spring means, for loading the note pad and for dispensing individual pages thereof.

\* \* \* \* \*